Patented Dec. 5, 1922.

1,437,584

UNITED STATES PATENT OFFICE.

HARRY BAKER CLAPP, OF BATTERSEA PARK ROAD, LONDON, ENGLAND, ASSIGNOR TO FEROLITE LIMITED, OF LONDON, ENGLAND.

REFRACTORY MATERIAL FOR HIGH-TEMPERATURE APPARATUS.

No Drawing.   Application filed July 25, 1921.   Serial No. 487,565.

*To all whom it may concern:*

Be it known that I, HARRY BAKER CLAPP, a subject of the King of Great Britain, residing at 2 Kirtling Street, Battersea Park Road, in the county of London, England, have invented certain new and useful Refractory Materials for High-Temperature Apparatus, of which the following is a specification.

This invention relates to refractory material for high temperature apparatus, the chief object being to provide a material which will not be attacked by the reacting materials in the producers, ordinary acid or basic lining materials being both liable to attack and to form a flux producing an undesirable amount of clinker and causing rapid destruction of the lining.

According to this invention the refractory material comprises a mixture of chromite and ferro-silicon ground to a suitable size and mixed with a binding material to such a consistency as will enable it to be applied in a plastic condition as a continuous layer or made in the form of bricks or slabs. The material may be mixed for example with sodium or potassium silicate and may be applied to the inner surface of the casing of the producer by tamping round a core, or suitably shaped slabs or bricks may be built up inside the casing.

The improved lining is neutral and it is found that it is practically free from attack by any of the compounds formed in the producers, so that a minimum amount of clinker is formed allowing the production of gas to proceed steadily and economically whatever ash contents the fuel may contain. It is also highly resistant to the action of high temperature gases of all kinds and possesses substantial mechanical strength. Moreover, owing to the fact that the co-efficients of expansion of the lining and the casing are of a similar order air leaks due to difference in expansion and contraction between the lining and the casing are avoided. The lining is especially suitable for portable gas producers adapted for use on motor vehicles, where it is necessary to employ a comparatively thin lining which must possess good mechanical strength and high heat resisting properties.

A suitable lining is prepared by using one part chromite (50 per cent or more $Cr_2O_3$) crushed or ground to pass through $\frac{1}{8}''$ mesh and one part crushed or ground to pass through $\frac{1}{16}''$ mesh, well mixed with finely ground ferro-silicon and just sufficient sodium silicate solution to cause binding or tamping round a core or pressing into slabs or bricks. The ferro silicon (about 70 per cent silicon) say about 5 per cent of the complete mass, is preferably first mixed with the silicate solution, about one part sodium silicate to three parts water being used. The amount of such solution usually employed is about 10 per cent of the total material.

What I claim and desire to secure by Letters Patent of the United States is:—

1. A refractory material for high temperature apparatus comprising a mixture of chromite and ferro-silicon reduced to small particles and mixed with a binding agent.

2. A refractory material for high temperature apparatus consisting of chromite and a binding material to which a small proportion of finely ground ferro-silicon is added for the purpose specified.

3. A refractory material for high temperature apparatus consisting of chromite reduced to small particles, an alkaline silicate forming a binding agent and a small proportion of finely divided ferro-silicon.

4. A refractory material for high temperature apparatus consisting of chromite, one part of which is reduced to particles which pass through a screen of one eighth inch mesh and another part reduced to particles which pass through a screen of one sixteenth inch mesh mixed with about ten per cent of sodium silicate solution forming a binding agent and about five per cent of finely ground ferro-silicon.

HARRY BAKER CLAPP.